United States Patent [19]
Klinger et al.

[11] 4,024,759
[45] May 24, 1977

[54] APPARATUS FOR MEASURING THE FLOW RATE OF A FLOWING MEDIUM

[75] Inventors: Helmut Klinger, Stuttgart; Wolfram Glauert, Bamberg, both of Germany

[73] Assignee: Robert Bosch G.m.b.H., Stuttgart, Germany

[22] Filed: Jan. 7, 1976

[21] Appl. No.: 647,152

[30] Foreign Application Priority Data
Jan. 15, 1975 Germany ............................ 2501380

[52] U.S. Cl. .............................................. 73/194 B
[51] Int. Cl.² .......................... G01F 1/00; G01F 1/76
[58] Field of Search ................ 73/194 B, 228, 32 A

[56] References Cited
UNITED STATES PATENTS

| | | | |
|---|---|---|---|
| 2,358,374 | 9/1944 | Ashcraft | 73/32 A |
| 3,175,399 | 3/1965 | Medlar | 73/194 B |
| 3,218,851 | 11/1965 | Sipin | 73/194 B |
| 3,608,374 | 9/1971 | Miller | 73/194 B |

*Primary Examiner*—Richard C. Queisser
*Assistant Examiner*—John P. Beauchamp
*Attorney, Agent, or Firm*—Edwin E. Greigg

[57] ABSTRACT

An apparatus for measuring the flow rate of a gaseous or liquid medium includes a baffle member which is poised in the stream on an elastic holder and permitted to execute inherent periodic motions. The flowing medium exerts a damping action on the moving element and the energy lost to the medium is related to the flow rate. The inherent velocity of the baffle is sensed by an inductive velocity sensor and the resulting signal is used to alter the current through a coil which produces an accelerating magnetic field that acts on conductors rigidly attached to the baffle. Thus, the energy required to maintain the inherent motions of the baffle is known and the flow rate may be inferred.

16 Claims, 12 Drawing Figures

APPARATUS FOR MEASURING THE FLOW RATE OF A FLOWING MEDIUM

BACKGROUND OF THE INVENTION

The invention relates to an apparatus for measuring the flow rate (quantity per unit time) of a flowing medium passing through a predetermined flow cross section.

There are known in the art instruments for measuring the flow rate of flowing media in which a measuring member experiences a displacement from its normal position in proportion to the flow rate. However, such instruments have the disadvantage of hysteresis which produces undesired measuring errors.

OBJECTS AND SUMMARY OF THE INVENTION

It is a principal object of the invention to provide a measuring instrument, for measuring the flow rate (mass per unit time) of a flowing medium, which is simply constructed and which does not have any undesirable hysteresis effects on the measured result.

This object is attained according to the invention by providing a static element or baffle element which executes natural constant periodic motion alternately in and against the direction of the current. The damping effect of the flowing medium on the natural oscillation of the baffle element results in an energy loss. This energy loss is proportional to the product of flow rate and linear velocity of the baffle plate and, by compensating for this energy loss, the flow rate may be determined.

It is an advantageous feature of the invention that the natural periodic motions of the baffle element are along a path which is normal to the direction of a local magnetic field and the field strength of the magnetic field may be changed in dependence of the flow rate so as to maintain constant the natural motions of the baffle element. In a preferred embodiment of the invention, the baffle element includes a transverse plate provided with electrical conductors that are disposed at right angles to the field lines of the magnetic field. An advantageous feature of the invention provides that the velocity of the baffle element itself is measured by a velocity sensor. This velocity sensor includes providing the baffle element with a tip of magnetically very conductive material which alters the reluctance of a magnetic loop of constant magnetic intensity. The voltage thereby induced in a coil is proportional to the velocity of the baffle element, and the electrical conductors disposed on the transverse plate carry an electric current whose strength is related to this voltage, which is itself proportional to the velocity of the baffle element. This voltage is fed to a comparator and may be compared with a nominal voltage so that the output signal from the comparator causes a change in the field strength provided by the electromagnet. Another favorable embodiment of the invention provides that the baffle element is a baffle plate disposed transversely to the direction of flow and mounted on a torsion spring so as to be rotatable about a central diameter of the flow cross section.

In a further, preferred embodiment of the invention, the flow cross section is circular and a flow diverter keeps a central region of the flow cross section free from flowing medium.

The invention will be better understood as well as further objects and advantages thereof become more apparent from the ensuing detailed description of preferred embodiments taken in conjunction with the drawing.

DESCRIPTION OF PREFERRED EMBODIMENTS

Figure 1:
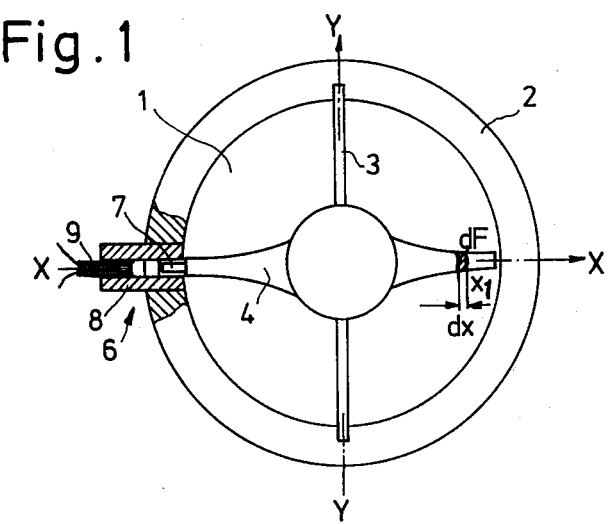
FIG. 1 is a front elevational cross sectional view of a flow rate meter according to the invention.
Figure 2:
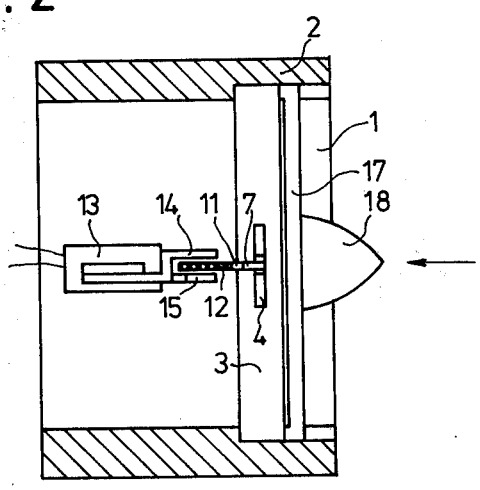
FIG. 2 is a side view of the flow rate meter shown in FIG. 1.
Figure 3:
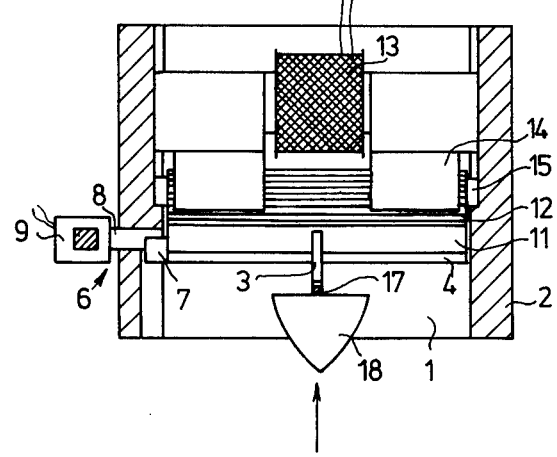
FIG. 3 is a top view of the flow rate meter according to this invention.
Figure 4:
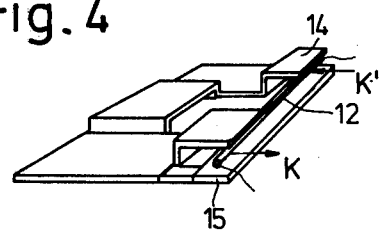
FIG. 4 shows a detail of construction in the flow rate meter according to the invention.

The measuring instrument for determining the flow rate of a flowing medium, according to this invention, is first depicted in FIG. 1, in which the flow cross section 1 for the flowing medium is determined by the free aperture of a tube 2 in which a baffle plate 4, serving as baffle element, is rotatably mounted on a torsional spring 3. The baffle plate 4 is embodied in such a manner that the width of its radial extent decreases with increasing distance from the center. The natural speed of motion of the baffle plate 4 is sensed by a velocity transducer 6. This transducer 6 includes an extension 7 on the end of the baffle plate 4 consisting of magnetically very conductive material which extends into the air gap between the poles of a permanent magnet 8 on which is wound a coil 9.

Connected to the baffle plate 4 is a horizontal plate 11 on which are located electrical conductors 12 at right angles to the field lines of a magnetic field which is produced by a coil 13 and whose exact extent is defined by foils 14 and 15 of highly magnetically conductive material.

A holder 17 fastened within the flow cross section 1 on the tube 2 carries a flow diverter 18 which directs the fluid flow away from a central region of the flow cross section.

The method of operation of the instrument depicted in FIGS. 1–4 is as follows: The flowing gaseous or liquid medium which streams through the flow cross section 1 exerts forces on the two extending wings of the baffle plate 4 which is rotatably mounted on the torsional spring 3. These forces tend to dampen the otherwise constant periodic oscillatory motion of the baffle plate. The energy loss per period which is experienced by the baffle plate due to the flowing medium is proportional to the product of the inherent velocity of the baffle plate $v_e$ and the rate of the flowing medium. When the inherent $v_e$ is known, then the flow rate, i.e., the mass per unit time of medium can be determined from the total energy supplied to the baffle plate. In order to derive this datum, the velocity sensor 6 measures the inherent baffle plate velocity $v_e$. This measurement is performed by providing an extension 7 of magnetically conductive material at the end of the baffle plate 4. This extension 7 alters the reluctance of the magnetic loop of the permanent magnet 8, thus inducing a potential $Uv_e$ in the coil 9 which is proportional to the inherent velocity of the baffle plate 4. The potential $Uv_e$ is fed to an operational amplifier (see FIG. 11) and is applied to the ends of the conductors 12 of the horizontal plate 11. By changing the field strength of the magnetic field produced by the coil 13, the energy loss experienced by the baffle plate 4 due to the damping by the flowing medium is compensated for. The current passing through the conductors 12 produces lateral forces K and K' which result in an accelerating moment on the baffle plate 4. The force $K$ experienced by a conductor carrying a current $I$ in a magnetic field of strength $B$ is given by the relation $$K = (\vec{I} \times \vec{B}) \cdot L,$$

respectively $K \sim V_e \cdot B$ in which $L$ is the effective length of the conductor and $I$ is the current which, in this case, is proportional to the inherent baffle plate velocity $v_e$. Under this latter assumption, if the maximum inherent velocity remains unchanged then the field strength $B$ is exactly proportional to the rate of flow of the flowing medium, as the product of field strength $B$ and velocity of the baffle plate thus must be proportional to the product of flow rate and again the velocity of the baffle plate. That means, that the magnetic field strength $B$ is indeed exactly proportional to the rate of flow of the flowing medium.

Figure 5:
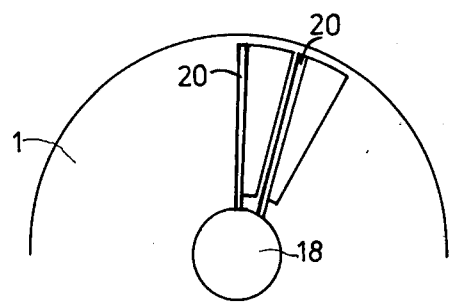
FIG. 5 is one example of a flow diverter.
Figure 6:
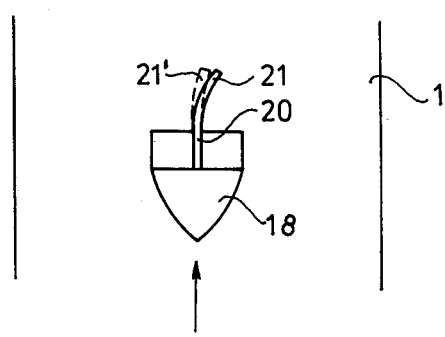
FIG. 6 is a top view of the flow diverter shown in FIG. 5.

In order to keep the pressure drop across the baffle plate as small as possible, the surface normal to the flow of the baffle plate 4 should be kept small. If the overall flow cross section 1 is circular, then the baffle plate should be so embodied that the width of its wings decreases with increasing radial distance from the central axis. This construction is based on the condition that the damping effect of any arbitrary small surface element $dF$ of the baffle plate 4 which is a portion of an annular surface of width $dx$ and which lies at a mean distance $X_1$ from the central axis of the flow cross section is proportional to the flow rate through this annular surface. On the other hand, this condition implies that a central region of the overall flow aperture would necessitate a width of the baffle plate which would seriously impair the flow of the medium and thus would lead to measuring errors. Accordingly, the central region of the flow aperture is kept free from fluid flow by a flow diverter element 18. As is shown in FIGS. 5 and 6, it is possible to connect with the flow diverter 18 a mechanism which can increase the flow resistance in the direction opposite to the preferred flow direction (which is designated by an arrow). This mechanism might include elastic tabs 20 whose end near the center is fixedly connected to the flow diverter 18. In FIG. 5, two tabs are shown by way of example. The ends 21 of the tab 20 point in the preferred direction of flow, as may be seen in FIG. 6, and thus the flowing medium tends to move them into the position 21' shown in dotted lines. If, however, the medium should flow in the direction opposite to the preferred direction of flow, the ends 21 of the tabs 20 are bent in that direction so that they nearly close the flow cross section to reverse flow. A mechanism of this type might be required if only the flow rate in a preferred direction is to be measured.

Figure 7:
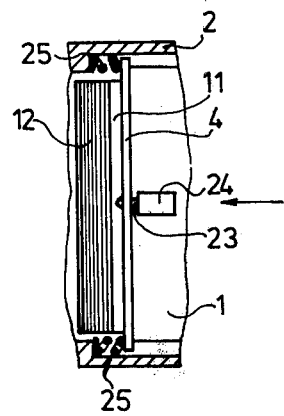
FIGS. 7–10 show several embodiments of the baffle element and its support which may be used in the apparatus according to the invention.
Figure 8:
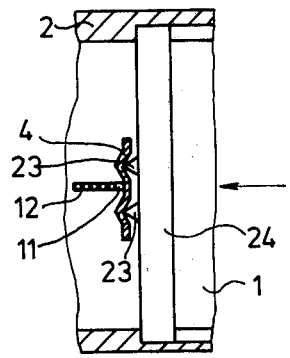

FIG. 7 illustrates a variant of the mounting means for the baffle plate 4 in which the baffle plate 4 is pivotably mounted on points 23 of a bearing block for movement about an axis 24 located in fixed position along a central diameter of the flow aperture 1. (See FIG. 8) The restoring force acting on the ends of the baffle plate 4 is exerted by springs 25. FIG. 8 is a view perpendicular to FIG. 7 and shows another variant of the baffle plate mounting on points for pivoting about a diametral axis. The restoring forces are again applied by the springs 25.

Figure 9:
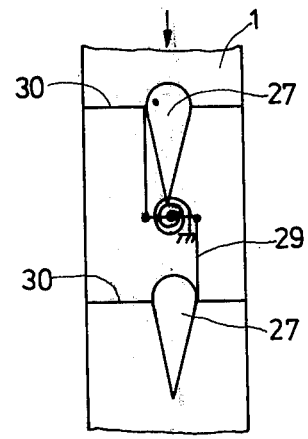

FIG. 9 depicts another embodiment of the flow rate measuring instrument in which two baffle elements 27 are disposed sequentially within the flow cross section 1. A system of levers 29 connects the two baffle elements 27, and flexible holding devices 30 capable of limited axial excursion and, fastened within the flow tube, permit them to execute mutually opposite axial movements.

Figure 10:
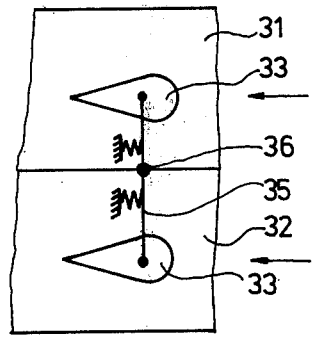

FIG. 10 depicts yet another embodiment of the flow rate measuring instrument in which the overall flow cross section is divided into two equally large flow cross sections 31, 32 each having within it a baffle element 33. The two baffle elements 33 are connected rigidly by a rod 35 and are pivotable about an axis of rotation 36. At least one of each of the baffle elements 27, 33, respectively, would be adapted with suitable equivalents of the velocity transducer 6 and the torque-producing elements 11, 13, 14, 15.

Figure 11:
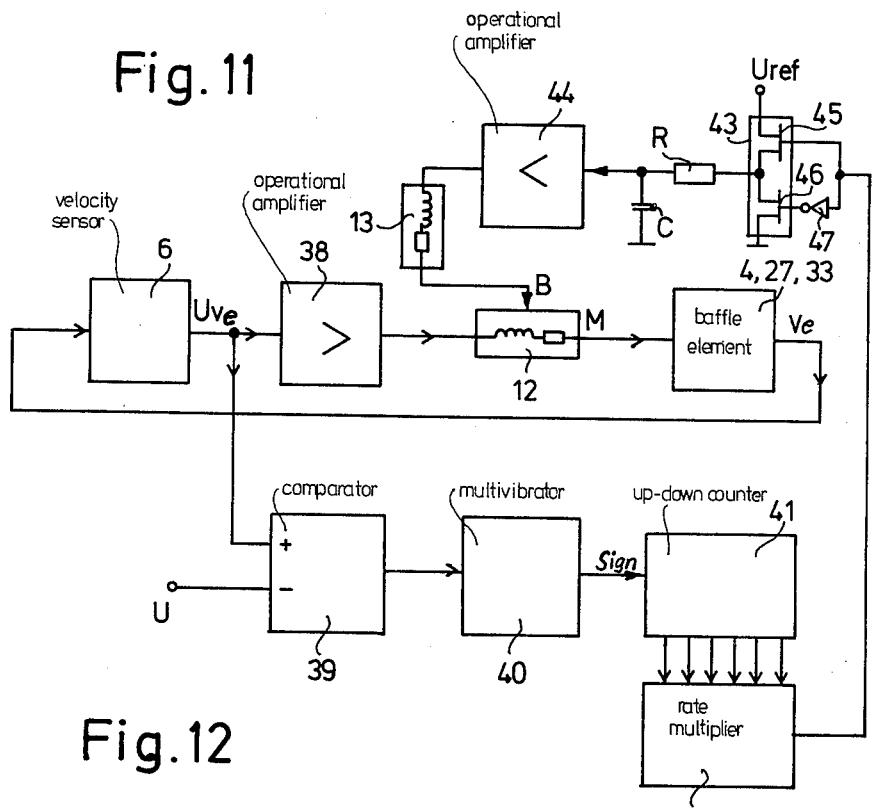
FIG. 11 is a schematic circuit diagram of the control process taking place within the instrument.

The electrical and electromagnetic characteristics of the flow rate measuring instrument according to the invention are indicated schematically in FIG. 11 which is a circuit diagram and shows the baffle elements 4, 27, 33, corresponding to the various embodiments described above. These baffle elements execute a constant periodic inherent motion with an inherent inherent velocity $v_e$ and are located within a flow cross section, such as previously described. A velocity sensor 6, already shown in mechanical and electrical detail in FIGS. 1 and 3, determines the inherent velocity of the baffle element by producing a proportional voltage $Uv_e$ which is amplified by an operational amplifier 38. This voltage is supplied across the current conductors 12 on the horizontal plate 11. The voltage $Uv_e$ which is proportional to the inherent velocity $v_e$ is also compared with a nominal voltage U in a comparator 39 (for example, Motorola 1710) whose output is fed to a multivibrator 40 (for example, SN 74121) which, in turn, controls an up-down counter 41 (SN 74191). The content of the counter is fed to a rate multiplier 42 (for example, SN 7497) in which it is transformed into a frequency proportional to the flow rate. This frequency is fed to a digital-to-analog converter 43, to be described in further detail below, in which it is retransformed into a voltage. This voltage passes via an RC link to an operational amplifier 44 in which it is amplified and fed to the coil 13. The magnetic field produced thereby in the coil 13 has a field strength B which is proportional to the flowing air or liquid quantity so that the conductors 12 mounted on the horizontal plate 11 experience an accelerating moment M which compensates for the damping moment exerted on the baffle plate by the flowing medium.

The digital-to-analog converter 43 includes a field effect transistor 45 (for example, part of CD 4016) whose control electrode is connected directly to the output of rate multiplier 42. Another field effect transistor 46 is connected in series with the first field effect transistor 45 and its control electrode is connected to the rate multiplier 42 via an inverter 47. Thus, depending on which of the two transistors 45, 46 is conducting, the output of the digital-to-analog converter 43 carries the reference voltage $U_{ref}$ or the ground potential.

Figure 12:
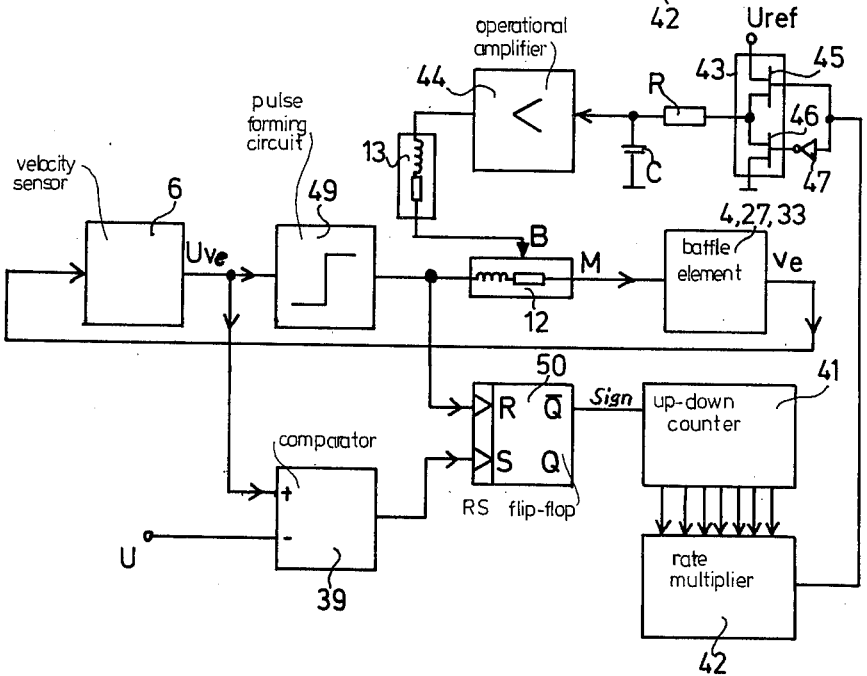
FIG. 12 is a variant of the circuit shown in FIG. 11.

The circuit shown in FIG. 12 differs from that in FIG. 11 only in that it includes a pulse forming circuit 49 (for example, CD 4007) which receives the voltage $Uv_e$ which is proportional to the inherent velocity $v_e$ of the baffle plate 4. The output of the pulse forming circuit 49 carries a square wave of constant amplitude which is fed to the electrical conductors 12. Futhermore, the up-down counter 41 is controlled in this instance by an RS flip-flop 50.

The inherent velocity of the baffle element can also be sensed by other transducer means such as a conventional magnetoresistive sensor, made for example from NiSb, and a permanent magnet, wherein one of these may be mounted on the baffle means and the other being stationary, as in the elements 7 and 8 of FIG. 1. The inherent velocity could also be transduced indirectly by measuring the torque in the torsional spring with the aid of piezo-electric sensors.

What is claimed is:

1. An apparatus for measuring the mass flow per unit time of a medium flowing through a conduit defining a flow aperture, comprising:
    A. baffle means, defining an axis of rotation and mounted within said conduit aperture for natural periodic motion within said flowing medium and provided with an extending portion made from a material with high permeability;
    B. Compensating means for supplying energy to said baffle means to compensate for kinetic energy lost to the flowing medium, said compensating means including means for generating a first magnetic field and said baffle means supporting current-carrying conductors for interaction with said first magnetic field and moving in a plane at right angles to the magnetic field lines, said compensating means further including means for changing the strength of said first magnetic field in dependence on the flow rate of the streaming medium to thereby maintain the natural periodic motions of said baffle means;
    C. velocity sensor means, including means for generating a voltage which is proportional to the velocity of said baffle means, said voltage being applied to said current-carrying conductors to cause therein a current of magnitude proportional to said velocity. and
    D. a source of reference potential and a comparator, said comparator receiving said reference potential and said voltage proportional to the velocity, the output from said comparator being fed to said means for generating a first magnetic field, thereby changing the field strength of said first magnetic field.

2. An apparatus as defined by claim 1, wherein said velocity sensor means includes a permanent magnet and a magnetoresistive sensor one of these being mounted on said baffle means and the other being stationary; whereby motions of said baffle means induce a voltage in said sensor.

3. An apparatus as defined in claim 1, wherein said velocity sensor means further includes a permanent magnet, fixedly located with respect to said conduit, a coil wound around said permanent magnet, the poles of said permanent magnet defining a second magnetic field, and said extending portion of said baffle means entering into said second magnetic field; whereby the magnetic reluctance between the poles of said permanent magnet is changed depending on the degree of said entrance and a voltage is induced in said coil, said voltage being proportional to the velocity of said baffle means.

4. An apparatus as defined in claim 3, wherein said electrical conductors are supplied with current of constant amplitude from a constant current source and of a direction which alternates with the direction of motion of said baffle means and said apparatus further comprises a source of reference potential and a comparator, said comparator receiving said reference potential and the voltage induced in said coil, the output from said comparator being fed to said means for generating a first magnetic field, thereby changing the field strength of said first magnetic field.

5. An apparatus as defined in claim 4, wherein said baffle means is a baffle plate, disposed in a plane transverse to the direction of flow.

6. An apparatus as defined in claim 5, further including a torsional spring, fastened in said conduit and extending along a diameter thereof and said baffle plate is mounted for rotation about said diameter on said torsional spring.

7. An apparatus as defined in claim 6, wherein said flow aperture is circular.

8. An apparatus as defined in claim 7, wherein the area of said baffle plate facing the fluid flow decreases with increasing distance from the center of said flow aperture.

9. An apparatus as defined in claim 8, wherein the azimuthal dimension of said baffle plate is such that the damping moment exerted by the flowing medium on a differential area dF of the baffle plate, said differential element dF being congruent with a portion of an annular area of said aperture, is proportional to the flow rate of the medium flowing through said annular area.

10. An apparatus as defined in claim 9, further comprising flow diverter means, attached to said conduit and located substantially in the center of said flow aperture, for diverting the flowing medium away from the central portion of said flow aperture.

11. An apparatus as defined in claim 10, wherein said flow diverter means includes means for increasing the impedance to the flowing medium in a preferred direction.

12. An apparatus as defined in claim 11, wherein said means for increasing the impedance include elastic tabs, attached at one end to said flow diverter means, said tabs having ends which extend into the direction of flow and which are bent away from the direction of flow.

13. An apparatus as defined in claim 1, wherein said baffle means is a baffle plate, disposed in a plane transverse to the direction of flow and mounted on pointed bearings so as to be pivotable around the central diameter of said flow aperture and including spring means attached to said conduit, for urging said baffle against said pointed bearings.

14. An apparatus as defined in claim 1, wherein said baffle means includes two separate baffle elements, connected by lever means, and holding means for holding said baffle elements in said conduit in a position one behind the other in the direction of flow and for movement in axially opposite directions.

15. An apparatus as defined in claim 1, wherein said conduit is divided into two parallel flow apertures and said baffle means includes a separate baffle element for each of said two flow apertures.

16. An apparatus as defined in claim 15, wherein said conduit includes means for holding said separate baffle elements in relative fixed relation and means defining an axis of rotation and said separate baffle elements are disposed to rotate around said axis of rotation.

* * * * *